United States Patent Office 3,524,879
Patented Aug. 18, 1970

3,524,879
POLYFLUORO NITRO AROMATIC COMPOUNDS
Paul Leslie Coe and John Colin Tatlow, Birmingham, England, assignors to Imperial Smelting Corporation (N.S.C.) Limited, London, England, a British company
No Drawing. Continuation-in-part of application Ser. No. 640,386, May 22, 1967. This application May 24, 1968, Ser. No. 731,722
Claims priority, application Great Britain, May 25, 1966, 23,353/66
Int. Cl. C07c 63/00, 79/12, 103/20
U.S. Cl. 260—515                    20 Claims

ABSTRACT OF THE DISCLOSURE

Good yields of highly fluorinated aromatic nitro compounds are obtained by nitrating highly fluorinated aromatic compounds having at least one hydrogen atom in at least one ring, the nitration being carried out by boron trifluoride and fuming nitric acid in the presence of a polar aprotic solvent, particularly sulpholane (tetrathiophen-1,1-dioxide). The method is used to prepare various new nitro compounds, having one or two aromatic rings, with (in some cases) other substituent groups in addition to fluorine and one or two nitro groups. For example, tetrafluoronitro-benzene substituted with bromine, iodine, alkyl, alkoxy, acetamido, amido, carboxyl or nitro groups and nitro- or dinitro-octafluorobiphenyl are disclosed. These compounds are useful as fungicides and bactericides and as intermediates.

---

This application is a continuation-in-part of our application Ser. No. 640,386, filed May 22, 1967, now abandoned.

This invention relates to the preparation of highly fluorinated aromatic compounds containing one or more nitro-groups attached to one or more aromatic rings. The process of the invention is applicable to the preparation of mononitro-compounds, e.g. pentafluoronitrobenzene, or compounds containing more than one nitrogroup. It is not intended, however, that the process now discovered be limited to the benzene series; nitro-derivatives of highly fluorinated fused or condensed aromatic rings may be produced by the method of the present invention.

It is already known in the art that the nitric acid-boron trifluoride system may be used for nitrating various organic compounds. Nitration of many compounds takes place easily, and high yields of the aromatic nitro-compound (80–90%) are usually obtained. However, it has been found that when this system is applied to fluorinated aromatic compounds only moderate yields of nitro-compounds are formed.

It is also already known in the art that nitration using $KNO_3/HF$ is possible. However, this involves the use of anhydrous hydrofluoric acid and an autoclave, which is both inconvenient, potentially dangerous and of very limited applicability.

The present invention consists in a method of preparing a highly fluorinated aromatic nitro compound from a mono- or polynuclear highly fluorinated aromatic compound having at least one ring containing at least two fluorine atoms and at least one hydrogen atom, wherein the said at least one ring is nitrated with a Lewis acid and fuming nitric acid in a polar aprotic solvent inert to the nitrating mixture.

Suitable examples of the Lewis acid are boron trifluoride and antimony pentafluoride, and suitable polar aprotic solvents are sulpholane (tetrathiophen-1,1-dioxide), dimethyl sulphone, N-methyl pyrrolidone and nitromethane.

In the preferred form of the invention the Lewis acid is boron trifluoride and the polar aprotic solvent is sulpholane. The nitration may be carried out at atmospheric pressure, more particularly in sulpholane.

It is found that the use of sulpholane as a solvent leads to greatly increased yields of nitro-products, and the invention provides an improved route to polyfluoronitro aromatic compounds.

A Lewis acid may be defined as a substance which can accept an electron pair to form a coordinate bond.

By the term "highly fluorinated" it will be understood that while the ring (or rings) in question contains predominantly fluorine atom substituents in order to impart to it the special characteristics of fluorinated aromatic compounds, other groups or substituent atoms may also be present. In general there will be not more than two such other groups per ring (or at least, per ring undergoing the nitration reaction). Such substituents may be, for example, halogen atoms other than fluorine, or the nitrile group which may be considered as a pseudo-halogen.

Other substituent groups which may be present include alkyl groups, more especially methyl and ethyl, perfluoroalkyl groups, especially trifluoromethyl, alkoxy groups, carboxyl groups, hydroxyl groups, amino groups and other nitrogen-containing groups such as amido and acetamido. It is convenient to use as starting materials compounds containing substituent groups which do not undergo any reaction with the nitration mixture.

The invention is particularly applicable to the nitration of aromatc compounds having a single carbocyclic ring substituted with four fluorine atoms, a hydrogen atom, and one other substituent as defined above.

In one form of the invention carbocyclic aromatic compounds which contain as substituents only hydrogen and fluorine atoms, are used as starting materials.

Suitable starting materials which may be used are pentafluorobenzene, 1,2,3,4-, 1,2,3,5-, or 1,2,4,5-tetrafluorobenzene, or 2H-nonafluorobiphenyl or 2,2'-dihydro-octafluorobiphenyl.

The invention is also applicable to the nitration of aromatic compounds having two carbocyclic rings having one or two hydrogen atoms in the compound and at least four fluorine atoms per ring.

Although the nitration according to the invention may be carried out under a wide range of conditions varying from 0° to 200° C. and for a period of time varying between 1 and 48 hours (or in the case of dinitration up to 7.5 days) convenient temperatures are found to lie within the range 65° to 90° C. and reaction times for the most part between 1 and 5 hours particularly 1 and 3 hours in the case of mononuclear compounds, although these are not to be taken as limits on the broad scope of the process.

The invention further consists in compounds prepared by the method of this invention as set forth above. Such compounds are highly fluorinated aromatic compounds containing one or more nitro-groups and at least two fluorine atoms attached to one or more aromatic rings which may, in addition, possess other substituent groups such as hydrogen, alkyl (methyl and ethyl in particular), perfluoroalkyl groups (especially trifluoromethyl), alkoxy groups, hydroxyl groups, carboxyl groups, amino groups, other halogens, nitrile groups, amido groups, acetamido groups and the like.

The invention provides certain new chemical compounds among which are the following:

2,3,4,6-tetrafluoronitribenzene
2,3,5,6-tetrafluoronitrobenzene
6-bromo-2,3,4,5-tetrafluoronitrobenzene 4-bromo-2,3,5,6-tetrafluoronitrobenzene
6-iodo-2,3,4,5-tetrafluoronitrobenzene
2-nitro-nonafluorobiphenyl
2-hydro-2'-nitrooctafluorobiphenyl
2,2'-dinitrooctafluorobiphenyl
2,3,5,6-tetrofluoro-4-nitroanisole
2,3,5,6-tetrafluoro-4-nitrotoluene
Tetrafluoro-1,3-dinitrobenzene
2,3,4,5-tetrafluoro-6-nitroacetanilide
3,4,5,6-tetrafluorodinitrobenzene
6-nitro-2,3,4,5-tetrafluorobenzamide
2,3,4,5-tetrafluoro-nitrobenzoic acid.

The fluorinated aromatic nitro-compounds produced by the process of the invention are useful as fungistats and bacteriostats. Typical fungi against which the compounds are effective are *Phytophthora palmivora, Pythium ultimum, Rhizoctonia solani, Fusarium oxysporum* f. *cubense, Verticillium albo-atrum, Lenzites trabea, Aspergillis niger, Cladosporium herbarum, Penicillium digitatum* and *Phytophthora infestans*. Typical bacteria against which the compounds are effective are *Xanthomonas malvacearum* and *Corynebacterium michiganese*. The compounds of the present invention are employed as fungistats and bacteriostats in a standard manner, specific illustrations of their use for such purpose being set forth in Examples 17–19.

In addition to the foregoing, the compounds of the present invention are useful as intermediates for forming compounds such as $o$-$C_6HF_4NH_2$ and $o$-$C_6BrF_4NO_2$ through reaction with tin and HCl and $Br_2+65\%$ oleum, respectively. The presence of the nitro-group activates certain of the ring fluorine atoms, particularly those in ortho and para positions, towards nucleophilic attack. For example, 2,3,4,6-tetrafluoronitrobenzene may be reacted with $NH_3$ in ether to form trifluoronitroaniline, which is useful as an antifungal agent. The other compounds may be similarly reacted to form analogous products.

The unsubstituted fluoronitro compounds are starting materials for the preparation of fluorinated aromatic diamines which are valuable intermediates for the preparation of polymers by condensation with, for example, a dibasic acid chloride. Merely by way of example, $m$-$C_6F_4(NH_2)_2$ may be condensed with $ClOC(CF_2)_4COCl$ under conventional conditions to form

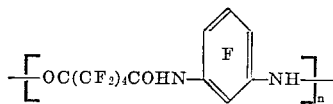

which is useful as a thermally stable resin. Similarly, $p$-$C_6F_4(NH_2)_2$ may be condensed with pyromellitic dianhydride under melt polymerisation conditions to form

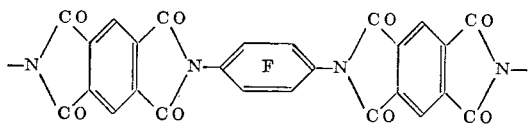

which is useful as a thermally stable polymer. The other unsubstituted fluoronitro compounds embraced within the present application may be similarly converted to useful polymeric materials.

Finally, all of the nitro compounds of the present application may be reduced by conventional methods, e.g. tin/hydrochloric acid, or hydrogen in the presence of a catalyst such as Raney nickel (see Tetrahedron, 23, 4719, 1967 for a description of these techniques), to amino compounds which have utility as intermediates and antifungal agents. For example, $o$-$C_6HF_4NO_2$ may be reduced in the manner indicated to form $o$-$C_6HF_4NH_2$ which is useful for the synthesis of fluorinated phenothiazines by the method described in Chemistry and Industry, 1966, 238. Similarly

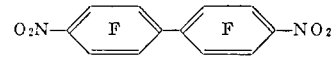

may be reduced to form

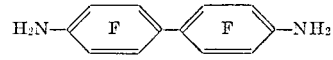

which is useful for the synthesis of polymers and dyes. The other compounds may also be reduced to their corresponding amines.

COMPARATIVE EXPERIMENT

Nitration of pentafluorobenzene with a nitric acid-boron trifluoride complex

Boron trifluoride was bubbled through a mixture of pentafluorobenzene (10.0 g.) and fuming nitric acid (9.5 cc., d. 1.5), whilst stirring at 0° C., until saturated. The mixture was then heated at 70° C., whilst stirring, for 10 hours. After carefully pouring into water (200 cc.) the organic layer was separated (4.0 g.). The aqueous phase was extracted with methylene chloride (50 cc.) and concentrated by fractionation. Distillation of the combined organic layer and concentrated extract from phosphoric oxide, afforded pentafluorobenzene (0.6 g.) and pentafluoronitrobenzene (3.6 g., 28%).

Analysis of the organic layer by g.p.c. before distillation showed that it consisted of 80% pentafluoronitrobenzene.

EXAMPLE 1

Nitration of pentafluorobenzene

A mixture of sulpholane (10 cc.) and fuming nitric acid (5.0 cc.) was saturated with boron trifluoride at 0° whilst stirring. A white, nearly solid complex was formed. Pentafluorobenzene (10.9 g.) was added and the mixture heated to, and maintained at, 75° for 2 hours. The complex quickly melted, whilst stirring, to give a homogeneous solution which was pale green in colour. Initially, some boron trifluoride was released on raising the temperature from 0° to 75°. On cooling the mixture was poured onto crushed ice, and the organic liquid which separated was steam distilled from the mixture to avoid extraction of sulpholane. The organic liquid (11.9 g.) in the distillate was separated and the aqueous layer shaken once with methylene chloride (25 cc.) to remove residual droplets of the nitrobenzene. After drying (MgSO$_4$), the extract was concentrated by fractionally distilling off the solvent.

Distillation under reduced pressure of the combined extract and organic layer from phosphoric oxide afforded pentafluoronitrobenzene as a very pale green, lachrymatory liquid (11.35 g., 82%), B.P. 158–160°. The nitrobenzene was identified by comparison of its infrared spectrum with that of specimen prepared by oxidation of pentafluoroaniline.

EXAMPLE 2

Nitration of 1,2,3,4 - tetrafluorobenzene to form 2,3,4,5-tetrafluoronitrobenzene and bromination thereof to form 6 - bromo - 2,3,4,5 - tetrafluoronitrobenzene.

A mixture of sulpholane (20 cc.) and fuming nitric acid (8.4 cc.) was saturated with boron trifluoride at 0°. 1,2,3,4 - tetrafluorobenzene (19.0 g.) was added and the mixture heated to and maintained at 70° for 1 hour. On cooling the solution was poured onto crushed ice, and steam distilled to separate the product (22.5 g.). The organic liquid in the distillate was separated and the aqueous phase extracted with methylene chloride (50 cc.). After drying (MgSO$_4$), the extract was concentrated as before, and the combined organic layer and concentrated extract were distilled under reduced pressure from phosphoric oxide. 2,3,4,5 - tetrafluoronitrobenzene (22.3 g., 90%) was obtained as a pale green lachrymatory liquid, B.P. 179° ($C_6HF_4NO_2$ requires: C, 36.92; H, 0.51. Found: C, 37.18; H, 0.72%).

Preparation of 6 - bromo - 2,3,4,5 - tetrafluoronitrobenzene by bromination of 2,3,4,5 - tetrafluoronitrobenzene (i) To a mixture of the nitrobenzene (16.5 g.) and bromine (7.4 cc., ca. 22 g.) was added fuming sulphuric acid containing 65% oleum (11 cc.) over a period of 2 hr., whilst stirring vigorously at 60°, and heating continued for a total of 6.5 hour. The mixture was cooled, and carefully poured onto crushed ice. Excess bromine was removed by addition of sodium metabisulphite, and the aqueous mixture steam distilled. An organic liquid (22.0 g.) was separated from the aqueous distillate and the latter was extracted once with methylene chloride (50 cc.). Distillation of the combined organic liquid and concentrated extract from phosphoric oxide afforded a pale green lachrymatory liquid (22.0 g.). Analysis by g.p.c. on silicone gum/Celite at 150°, 10 p.s.i. nitrogen, showed that no 1,2-dibromotetrafluorobenzene was present. Redistillation afforded a liquid (21.4 g., 92%), B.P. 200°, identified as the bromonitrobenzene ($C_6BrF_4NO_2$ requires: C, 26.24; H, 0. Found: C, 26.65; H, 0.11%).

EXAMPLE 3

Nitration of 1,2,3,5-tetrafluorobenzene

A mixture of sulpholane (10 cc.) and fuming nitric acid (2.5 cc.) was saturated with boron trifluoride whilst stirring at 0°. 1,2,3,5 - tetrafluorobenzene (4.9 g.) was added and the mixture heated to, and maintained at, 65° for 1.5 hour. On cooling the mixture was poured onto crushed ice and steam distilled to separate the product (5.6 g.) from sulpholane. The organic layer was separated from the aqueous distillate, and the latter was extracted once with methylene chloride (25 cc.). After drying ($MgSO_4$) the extract was concentrated by fractional distillation of the solvent. Distillation under reduced pressure, of the combined organic layer and concentrated extract, from phosphoric oxide, afforded 2,3,4,6 - tetrafluoronitrobenzene as a very pale green, lachrymatory liquid. (5.6 g., 88%), B.P. 177–178° ($C_6HF_4NO_2$ requires: C, 36.92; H, 0.51. Found: C, 37.19; H, 0.73%).

EXAMPLE 4

Nitration of 1,2,4,5-tetrafluorobenzene

A mixture of sulpholane (30 cc.) and fuming nitric acid (2.1 cc.) was saturated with boron trifluoride at 0°. 1,2,4,5-tetrafluorobenzene (5.0 g.) was added and the temperature raised to 65°. After maintaining this temperature for 1.5 hr., while stirring slowly, the mixture was cooled and poured onto crushed ice. Steam distillation quickly separated the products of the reaction, and a pale green liquid was obtained (1.15 g.). By fractional distillation at 25 mm. Hg pressure, 2,3,5,6-tetrafluoronitrobenzene was obtained as a very pale green lachrymatory liquid (0.8 g.), B.P. 88–90 at 43 mm. Hg ($C_6HF_4NO_2$ requires: C, 36.92; H, 0.51. Found: C, 36.95; H, 1.07%.).

EXAMPLE 5

Nitration of 5-bromo-1,2,3,4-tetrafluorobenzene

To a mixture of sulpholane (10 cc.) and fuming nitric acid (1.8 cc.) which had been saturated with boron trifluoride at 0° was added the bromobenzene (4.4 g.), and the nitration performed at 65° for 2 hr. On cooling, the mixture was poured onto crushed ice and the products separated by steam distillation. The organic layer (4.6 g.) was separated from the aqueous distillate and the latter extracted once with methylene chloride (25 cc.) Distillation of the combined organic layer and concentrated extract from phosphoric oxide afforded a pale green, lachrymatory liquid (4.45 g., 84%), B.P. 200°, identical to that obtained by bromination of the nitrobenzene in Example 2, and identified as 6-bromo-2,3,4,5-tetrafluoronitrobenzene.

EXAMPLE 6

Nitration of 3-bromo-1,2,4,5-tetrafluorobenzene

A mixture of sulpholane (10 cc.) and fuming nitric acid (1.5 cc.) was saturated with boron trifluoride at 0°. 3-bromo-1,2,4,5-tetrafluorobenzene (1.95 g.) was added and the temperature raised to 65°. After stirring slowly at this temperature for 2 hr. the mixture was poured onto ice and steam distilled. A pale green liquid in the steam distillate crystallised to yield a pale green solid (2.2 g.,). The solid was twice "sublimed" from a little phosphoric oxide at 80°/25 mm. Hg, to yield a nearly white crystalline solid (1.9 g., 82%), M.P. 50.5–51.5°, identified as 4-bromo-2,3,5,6-tetrafluoronitrobenzene ($C_6BrF_4NO_2$ requires: C, 26.24; H, 0. Found: C, 26.31; H, 0.30%).

Its infrared spectrum was identical to that of a sample prepared by oxidation of the respective aniline.

EXAMPLE 7

Nitration of 1,2,3,4-tetrafluoro-5-iodobenzene

The iodobenzene (6.0 g.) was added to a mixture of sulpholane (20 cc.) and fuming nitric acid (2.5 cc.) which had been saturated with boron trifluoride at 0°. After nitrating for 2.5 hr. at 60°, the homogeneous solution was cooled and poured onto crushed ice. A pale green liquid was obtained on steam distillation. The aqueous distillate was extracted with methylene chloride (25 cc.) and the combined organic layer and concentrated extract distilled from phosphoric oxide under reduced pressure. As usual, a pale green liquid was obtained, B.P. 122–125°/28 mm. Hg, 221–223°, which was identified as 2,3,4,5-tetrafluoro-6-iodonitrobenzene (5.5 g., 78.5%) ($C_6F_4INO_2$ requires: C, 22.43; H, 0. Found: C, 22.47; H, 0.7).

EXAMPLE 8

Nitration of 2H-nonafluorobiphenyl 2H-nonafluorobiphenyl was prepared by reaction of pentafluorophenyl lithium with pentafluorobenzene, in 65% yield.

A mixture of sulpholane (20 cc.) and fuming nitric acid (2.4 cc.) was saturated with boron trifluoride at 0°. The biphenyl (7.6 g.) was added, and the mixture heated to, and maintained at, 65° for 3 hr. On cooling, the homogenous solution was poured onto crushed ice, and steam distilled, affording an organic liquid in the distillate which soon crystallised. Analysis by g.p.c. on silicone gum/Celite at 150°, 10 p.s.i. $N_2$, of this solid showed that nitration was complete. The solid was crystallised from light petroleum (B.P. 60–80°), affording pale green, needle-shaped crystals (5.05 g.), M.P. 75–75.5°, without further purification "sublimation" of the residual oil, after evaporation of solvent, afforded a further quantity (1.2 g.). The total yield was 6.25 g., 72%.

The following experiment was carried out for comparative purposes:

To a mixture of the diphenyl (6.4 g.) and concentrated sulphuric acid (10 cc.) at 75° was added, dropwise, a mixture of fuming nitric acid (5 cc.) and concentrated sulphuric acid (5 cc.). After maintaining this temperature for 1 hr. the mixture was cooled, poured onto crushed ice, and carefully neutralised with aqueous sodium hydroxide (45 g.). Extraction of the aqueous mixture with other afforded a brown oil (4.2 g.) after drying ($MgSO_4$) and distilling off the solvent. "Sublimation" afforded pale green crystals (3.7 g., 50%), M.P. 73–75°, identical to those previously obtained.

EXAMPLE 9

(A) Nitration of 2,2'-di-H-octafluorobiphenyl

Preparation—5-bromo-1,2,3,4 - tetrafluorobenzene (8.4 g.) and activated copper bronze (8.8 g.) in a sealed tube (12" x ¾") were maintained at 215° for 22 hr. On cooling, the tube was opened, the products extracted with boiling acetone, filtered and the filtrate was concentrated by fractional distillation of the solvent. Residual solvent was evaporated, and the residues sublimed under reduced pressure to yield colourless crystals (3.2 g., 59%), M.P. 78–79°, which were identified by infrared spectroscopy as 2,2′-di-H-octafluorobiphenyl (2,2′,3,3′,4,4′,5,5′-octafluorobiphenyl).

(i) To 1,2,3,4-tetrafluorobenzene (13.2 g.) in ether (30 cc.) in an atmosphere of nitrogen was added n-butyllithium (0.15 g./l., 38 cc.) in ether-hexane over a period of 5 mins. at −70°. After maintaining this temperature for 70 mins., titanic chloride (12 cc.) was added, the resulting mixture stirred at −70° for 1 hr., allowed to warm up to room temperature and then stirred for a further 2 days at this temperature. After pouring carefully onto ice, the ether layer was separated, and the aqueous layer extracted once with ether. The combined ethereal solutions were dried ($MgSO_4$), the solvent evaporated and the residue distilled under reduced pressure to give a colourless liquid (5.1 g., 40%), which solidified on standing at room temperature. The solid was identified as 2,2,′-di-H-octafluorobiphenyl by infrared spectroscopy.

(B) Nitration to 2H-2′-nitro-octafluorobiphenyl

To a mixture of sulpholane (12 cc.) and fuming nitric acid (0.7 g.) which had been saturated with boron trifluoride was added 2,2′-di-H-octafluorobiphenyl (2.5 g.), and the mixture heated to, and maintained at, 65° for 5 hrs. On cooling the mixture was poured onto crushed ice, and the product steam distilled from the mixture. An organic liquid in the aqueous distillate soon solidified. This solid (2.8 g.) was analysed by g.p.c. on silicone gum/Celite at 120°, 10 p.s.i. $N_2$, and shown to contain a small quantity of the un-nitrated biphenyl. By chromatography on a column of silica gel (20″ x 1¼″) in light petroleum (B.P. 70–80°)/ether (4:1), 2H-2′-nitro-octafluorobiphenyl (2.7 g.) was obtained. Purification by sublimation afforded a colourless solid, M.P. 52–53° ($C_{12}HF_8NO_2$ requires: C, 41.99; H, 0.92. Found: C, 41.99; H, 0.43%).

(C) Dinitration to 2,2′-dinitro-octafluorobiphenyl

To a mixture of sulpholane (20 cc.) and fuming nitric acid (4 cc.) which had been saturated with boron trifluoride at 0°, was added 2,2′-di-H-octafluorobiphenyl (3.3 g.) and the mixture heated to, and maintained at, 65° for 4 hrs. Separation of the product in the normal manner afforded a pale green solid (3.2 g.) which on analysis by g.p.c. on silicone gum/Celite at 180°, 10 p.s.i. $N_2$, was shown to contain only 2,2′-dinitro-octafluorobiphenyl. The solid crystallised from light petroleum (B.P. 60–80°)/benzene solution, affording pale green, needle-shaped crystals (3.0 g.), (70%), identified by infrared spectroscopy as the dinitrobiphenyl, M.P. 119–119.5°.

The following experiment was carried out for comparative purposes:

A mixture of 6-bromo-2,3,4,5-tetrafluoronitrobenzene (4.8 g.) and activated copper bronze (5.2 g.) was maintained at 170° for 42 hrs. in a sealed tube (6″ x ¾″). On cooling and opening the tube, the product was extracted with acetone, the solvent distilled off, and the residue (3.2 g.) sublimed under reduced pressure. A pale green, crystalline solid (2.6 g.) was obtained, easily crystallised from light petroleum (B.P. 60–80°)/benzene, affording pale green, needle-shaped crystals, M.P. 118–119° which were identified by infrared spectroscopy as 2,2′-dinitro-octafluorobiphenyl.

EXAMPLE 10

Nitration of 2,3,5,6-tetrafluoroanisole

The anisole was prepared by nucleophilic substitution of pentafluorobenzene by sodium methoxide in methanol.

The anisole (2.2 g.) was added to a mixture of sulpholane (10 cc.) and fuming nitric acid (1.4 cc.) which had been saturated with boron trifluoride at 0°. Nitration was performed at 70° for 1.5 hrs., and the product separated in the usual manner. A yellow oil (1.3 g., 47%) was obtained, which crystallised on refrigeration. Analysis by g.p.c. on silicone gum/Celite at 150°, 10 p.s.i. $N_2$ indicated complete nitration as there was only one component in the product.

Crystallisation from light petroleum (B.P. 60–80°) afforded yellow crystals, M.P. 38–39° identified as 2,3,5,6-tetrafluoro-4-nitro-anisole.

EXAMPLE 11

Nitration of 2,3,5,6-tetrafluorotoluene

The toluene was prepared by nucleophilic substitution of pentafluorotoluene by hydrazine hydrate in ethanol, and dehydrazination of the product (overall yield, 30%).

A mixture of sulpholane (10 cc.) and fuming nitric acid (1.5 cc.) was saturated with boron trifluoride at 0°. 2,3,5,6-tetrafluorotoluene (2.5 g.) was added and the mixture heated to, and maintained, at 70° for 2.75 hrs. On cooling the solution was poured onto crushed ice and the products separated by the usual procedure. The liquid product (1.8 g.) crystallised easily, but not from light petroleum (B.P. 40–60°) solution. Purification was effected by repeated distillation under reduced pressure, from a little phosphoric oxide. 2,3,5,6-tetrafluoro-4-nitrotoluene (1.2 g., 42%) was obtained as a pale green liquid which soon crystallised, M.P. 33–34° ($C_7H_3F_4NO_2$ requires: C, 40.19; H, 1.44. Found: C, 40.00; H, 1.84%).

EXAMPLE 12

Dinitration of 1,2,3,5-tetrafluorobenzene (i) A mixture of sulpholane (20 cc.) and fuming nitric acid (6 cc.) was saturated with boron trifluoride at 0°. 1,2,3,5-tetrafluorobenzene (5.1 g.) was added and the dinitration carried out at 70° for 18 hrs. Separation of the products (5.7 g.) in the normal manner and fractional distillation under reduced pressure from a little phosphoric oxide afforded 2,3,4,6-tetrafluoronitrobenzene (4.5 g., 68%) and tetrafluoro-1,3-dinitrobenzene (0.6 g., 7%).

(ii) Sulpholane (20 cc.) and fuming nitric acid (5 cc.) were saturated with boron trifluoride at 0°, 1,2,3,5-tetrafluorobenzene (6.2 g.) was added, and the nitration performed at 65° for 2 hrs., and a further 20 hrs. at 90°. At this temperature some nitrogen oxides were noticed and a white solid formed in the homogeneous mixture. Extraction of the product (5.8 g.) in the usual manner followed by reduced pressure distillation from phosphoric oxide afforded the mononitrobenzene (4.9 g., 61%) and the dinitrobenzene (0.6 g., 6%).

(iii) The experiment was repeated, and after 4 days at 65–70°, the product (5.7 g.) was shown by g.p.c. analysis on silicone gum/Celite at 130°, 10 p.s.i. $N_2$, to be one-third by weight of the dinitrobenzene. Separation by g.p.c. on silicone gum/Celite at 155°, 15 l./hr. $N_2$, afforded the mononitrobenzene (3.1 g., 39%) and the dinitrobenzene (1.4 g., 14%).

(iv) Dinitration of 1,2,3,5-tetrafluorobenzene (6.3 g.) was carried out at 65° for 7.5 days with a mixture of sulpholane (20 cc.) and fuming nitric acid (6 cc.) which had been saturated with boron trifluoride. Separation of the products (5.3 g.) in the usual manner afforded the mononitrobenzene (1.65 g., 20%) and dinitrobenzene (2.1 g., 21%). The product before the final g.p.c. separation (70% recovery) contained 58% of the dinitrobenzene on analysis by g.p.c.

Tetrafluoro-1,3-dinitrobenzene was a pale green, lachrymatory liquid, B.P. 228–9° (156–158°/60 mm. Hg) ($C_6F_4N_2O_4$ requires: C, 30.00; H, 0. Found: C, 29.7; H, 0.49%).

EXAMPLE 13

Nitration of 2,3,4,6-tetrafluoronitrobenzene 2,3,4,6-tetrafluoronitrobenzene (12.9 g.) was added to a mixture of sulpholane (30 cc.) and fuming nitric acid (20 cc.) which had been saturated with boron trifluoride at 0°, and the nitration performed at 70° for 7.5 days. Separation of the product (12.1 g.) by steam distillation, and then g.p.c. on silicone gum/Celite at 150°, 15 l./hr. N$_2$, afforded the mononitrobenzene (0.3 g., ca. 2% recovery) and tetrafluoro-1,3-dinitrobenzene (10.9 g., 70%). The dinitrobenzene was identical to that previously obtained by dinitration of 1,2,3,5-tetrafluorobenzene. A material recovery of ca. 85% was made on the final g.p.c. separation.

EXAMPLE 14

Nitration of 2,3,4,5-tetrafluoroacetanilide, preparation of 2,3,4,5-tetrafluoronitroaniline and 3,4,5,6-tetrafluoro dinitrobenzene 2,3,4,5-tetrafluoroacetanilide (2.0 g.) was treated with fuming nitric acid (5 ml.) in sulpholane (20 ml.) saturated with boron trifluoride for 170 hours at 20–25° C. The reaction mixture was then poured onto crushed ice and steam distilled. A pale green liquid distillate solidified to give as a pale yellow solid, M.P. 149–151, 2,3,4,5-tetrafluoro-6-nitroacetanilide. Without further purification, this compound was hydrolysed with concentrated sulphuric acid to 2,3,4,5-tetrafluoronitroaniline, M.P. 40–41° C. identical with sample prepared by another route (Brooke, Burdon, and Tatlow, J. Chem. Soc., 1961, 802).

A solution of 2,3,4,5-tetrafluoronitroaniline (10.5 g.) in ethylene chloride (30 ml.) was added over 45 minutes to a stirred mixture of 85% hydrogen peroxide (19 ml.), trifluoroacetic anhydride (39 g.) and methylene chloride (60 ml.). The mixture was boiled for 4 hours, water (100 ml.) added, and the organic layer separated off. After washing, drying and distillation 3,4,5,6-tetrafluorodinitrobenzene was obtained, B.P. 89° C./0.9 mm. Hg, M.P. 31–33° C.

EXAMPLE 15

Nitration of 2,3,4,5-tetrafluorobenzamide

A mixture of sulpholane (20 ml.) and fuming nitric acid (4 ml.) was saturated with boron trifluoride at 0°, and then allowed to warm to room temperature. 2,3,4,5-tetrafluorobenzamide (1.9 g.) as a suspension in sulpholane (30 ml.) was then added, and the whole warmed to 30° C. After stirring at this temperature for 150 hours, the mixture was poured onto ice, and ether extracted. The ethereal solution was washed, dried, and evaporated to give a solid which was shown by its infrared spectrum to be a mixture of unreacted starting material and the desired 6-nitro-2,3,4,5-tetrafluorobenzamide.

EXAMPLE 16

Nitration of 2,3,4,5-tetrafluorobenzoic acid

A mixture of sulpholane (20 ml.) and fuming nitric acid (5 ml.) was saturated with boron trifluoride at 0° C., and a solution of 2,3,4,5-tetrafluorobenzoic acid in sulpholane (10 ml.) was added. The temperature was then raised to and maintained at 35° C. for 100 hours. The mixture was then poured, onto ice, and steam distilled. The distillate was ether extracted, and the ether then evaporated away to leave a solid. This was shown by infrared analysis to contain the desired nitro compound.

EXAMPLE 17

Method

Test compound was incorporated into a nutrient potato agar dextrose whilst molten at a rate sufficient to produce a final concentration of 30 parts per million by weight per volume of medium. The liquid, when cool, was poured into Petri dishes and inoculated with the fungal species, as a 6 mm. diameter mycelial disc. After incubation for 7 days at 23° C., the diameter of the colonies were measured. In each case, the tested compounds caused a greater than 95% reduction of growth by comparison with untreated controls.

Fungi (1) *Phytophthora palmivora*
(2) *Pythium ultimum*
(3) *Rhizoctonia solani*
(4) *Fusarium oxysporum* f. *cubense*
(5) *Verticillium albo-atrum*
(6) *Lenzites trabea*
(7) *Aspergillus niger*
(8) *Cladosporium herbarum*
(9) *Penicillium digitatum*

Results

| Compound | Fungus used |
|---|---|
| 1,2-dinitrotetrafluorobenzene | 1–9 inclusive. |
| 1,3-dinitrotetrafluorobenzene | 1–9 inclusive. |
| 2,2'-dinitro-octafluorobiphenyl | 3, 6, 8 and 9. |

The column headed "Fungus used" indicates all the fungi used in testing the respective compound. Successful results were obtained in each test, as indicated above.

EXAMPLE 18

Method

An 0.2% aqueous acetone suspension of the test compound, 2,2'-dinitro-octafluorobiphenyl, together with 0.05% of the wetting agent Lissapol NX was sprayed onto young potato plants. When dry, they were inoculated with a spore suspension of the blight *Phytophthora infestans*. After 14 days growth under 95% humidity conditions the plants were examined. Whereas 95% of the foliage of treated plants was undamaged, less than 5% of that of the controls was undamaged.

EXAMPLE 19

Method

A 1% solution of each of the two test compounds indicated below in polyethylene glycol (Carbowax 400) was diluted with 2% dextrose nutrient broth to give concentrations of 1,000, 200, 40 and 8 parts per million. Samples were then inoculated with the bacteria *Xanthomonas malvacearum* and/or *Corynebacterium michiganense* and then incubated for 8 days at 25° C. At the end of this period the bacteriostatic activity was assessed visually. To measure bactericidal activity, after 24 hours incubation, a loopful of broth was transferred into 5 ml. of untreated medium, incubated for 7 days at 25° C. and similarly examined.

Results 1,2-dinitrotetrafluorobenzene: bacteriostat and bacteriocide to both organisms at 8 p.p.m. 1,3-dinitrotetrafluorobenzene: bacteriostat to Xanthomonas at 200 p.p.m.

We claim:

1. A method of nitrating a highly fluorinated aromatic compound having at least one aromatic ring containing at least two fluorine atoms and at least one hydrogen atom which comprises reacting said compound with a Lewis acid and fuming nitric acid in a polar aprotic solvent inert to the nitrating mixture, and separating the highly fluorinated aromatic nitro compound formed.

2. A method according to claim 1 wherein the Lewis acid is borontrifluoride.

3. A method according to claim 1 wherein the polar aprotic solvent is sulpholane.

4. A method according to claim 1 wherein the reaction is carried out at atmospheric pressure.

5. A method according to claim 1 wherein the reaction is carried out at a temperature within the range 65 to 90° C. for a time between 1 and 5 hours.

6. An aromatic compound having a single carbocyclic ring substituted with four fluorine atoms, a nitro group and a substituent selected from bromine, iodine, alkyl, alkoxy, acetamido, amido, carboxyl and nitro.

7. A compound according to claim 6 which is 6-bromo-2,3,4,5-tetrafluoronitrobenzene.

8. A compound according to claim 6 which is 4-bromo-2,3,5,6-tetrafluoronitrobenzene.

9. A compound according to claim 6 which is 6-iodo-2,3,4,5-tetrafluoronitrobenzene.

10. A compound according to claim 6 which is 2,3,5,6-tetrafluoro-4-nitroanisole.

11. A compound according to claim 6 which is 2,3,5,6-tetrafluoro-4-nitrotoluene.

12. A compound according to claim 6 which is tetrafluoro-1,3-dinitrobenzene.

13. A compound according to claim 6 which is 2,3,4,5-tetrafluoro-6-nitroacetanilide.

14. A compound according to claim 6 which is 3,4,5,6-tetrafluorodinitrobenzene.

15. A compound according to claim 6 which is 6-nitro-2,3,4,5-tetrafluorobenzamide.

16. A compound according to claim 6 which is 2,3,4,5-tetrafluoro-nitrobenzoic acid.

17. An aromatic compound having two carbocyclic rings having one or two nitro groups in the compound and at least four fluorine atoms per ring, the remaining positions (if any) being occupied by hydrogen.

18. An aromatic compound according to claim 17 which is 2-nitro-nonafluorobiphenyl.

19. An aromatic compound according to claim 17 which is 2-hydro-2′-nitrooctafluorobiphenyl.

20. An aromatic compound according to claim 17 which is 2,2′-dinitrooctafluorobiphenyl.

References Cited

UNITED STATES PATENTS

| | | | |
|---|---|---|---|
| 3,293,305 | 12/1966 | Haszeldine et al. | 260—646 X |
| 3,294,629 | 12/1966 | Pyne et al. | 424—349 |
| 3,326,983 | 6/1967 | Vesely et al. | 260—646 X |

OTHER REFERENCES

Finger et al.: J. Am. Chem. Soc., vol. 73, pp. 152–153 (1951).

LELAND A. SEBASTIAN, Primary Examiner

U.S. Cl. X.R.

260—558, 562, 580, 612, 646; 424—315, 324, 340, 349